United States Patent [19]

Rossi et al.

[11] 3,767,561

[45] Oct. 23, 1973

[54] ALPHA-OLEFIN POLYMERS AS DEWAXING AIDS

[75] Inventors: Albert Rossi, Jersey City; Erik Tornqvist, Roselle; Norman Jacobson, East Brunswick; Won Ryul Song, Jersey City, all of N.J.

[73] Assignee: Esso Research and Engineering Company, Linden, N.J.

[22] Filed: July 21, 1971

[21] Appl. No.: 164,892

Related U.S. Application Data

[63] Continuation of Ser. No. 818,380, April 22, 1969, abandoned.

[52] U.S. Cl. .................... 208/37, 208/33, 208/38
[51] Int. Cl. ............................................. C10g 43/06
[58] Field of Search ...................... 208/33, 37, 38; 44/62, 80

[56] References Cited
UNITED STATES PATENTS

| | | | |
|---|---|---|---|
| 3,393,144 | 7/1968 | Button et al. | 208/33 |
| 3,639,226 | 2/1972 | Henselman et al. | 208/33 |
| 3,448,050 | 6/1969 | Young et al. | 44/62 |
| 3,252,771 | 5/1966 | Clough et al. | 44/62 |
| 3,355,379 | 11/1967 | Leonard | 208/33 |
| 2,379,728 | 7/1945 | Lieber | 208/33 |
| 3,458,430 | 7/1969 | Henselman et al. | 208/33 |
| 3,523,073 | 8/1970 | Moyer | 208/33 |
| 3,239,445 | 3/1966 | Leonard et al. | 208/33 |
| 3,475,321 | 10/1969 | Henselman et al. | 208/33 |

*Primary Examiner*—Herbert Levine
*Attorney*—Pearlman & Stahl and Roy J. Ott

[57] ABSTRACT

Ziegler-type polymers comprising $C_{14}$–$C_{24}$ alpha-monoolefins and having a number average molecular weight within the range between about 1,000 and about 200,000 are effective dewaxing aids for improving the efficiency of the separation of wax from hydrocarbon oils. Preferred dewaxing aids include mixtures of two or more homopolymers of $C_{14}$–$C_{24}$ alpha-monoolefins and copolymers of two or more alpha-monoolefins containing from 14 to 24 carbon atoms in the molecule.

The Ziegler-type polymers when combined with Friedel-Crafts condensation products of chlorinated wax and naphthalene synergistically improve the separation of wax from petroleum oils.

8 Claims, No Drawings

ALPHA-OLEFIN POLYMERS AS DEWAXING AIDS

RELATED APPLICATION

This application is a continuation of Ser. No. 818,380, filed Apr. 22, 1969 and now abandoned.

BACKGROUND OF THE INVENTION

1. Field of the Invention

This invention relates to a dewaxing aid for improving the separation of waxes from a petroleum oil. More particularly, the invention is concerned with the utilization of a Ziegler-type polymer comprising a $C_{14}$–$C_{24}$ alpha-monoolefin.

2. Description of the Prior Art

Various methods are known in the art for separating wax from petroleum oil. One such method, for instance, is chilling the wax-containing oil and filtering off the solid wax. One of the most commonly used methods of dewaxing oils is known as solvent dewaxing. This comprises diluting the oil with a solvent, heating until complete solution is obtained, and then chilling until the desired amount of wax has crystallized out. The wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Very fine crystals tend to clog the filter media rapidly, reducing the filtration rate and eventually necessitating shutdown of the filters for removal of the accumulated wax. Very large crystals tend to form gel-like interlocking masses which do not form a compact filter cake, which contain a large amount of oil and solvent, and which are difficult to wash.

As a solution to this problem, it has become the practice in the art to incorporate in the wax-containing petroleum oil materials which modify the size and shape of wax crystals in such a manner as to permit more rapid separation of the wax during dewaxing operations. These materials are known as dewaxing aids. For example, U.S. Pat. No. 3,355,379, discloses a dewaxing process employing a poly-alpha-olefin dewaxing aid having an average molecular weight of ten million or more. It is further disclosed therein that the molecular weight is critical since lower molecular weight polymers were found to be essentially inactive. In one aspect, the dewaxing aid of the present invention differs from the aforesaid patent in that it has been found that certain polymers of alpha-monoolefins are very effective dewaxing aids when said polymers have relatively low molecular weights.

SUMMARY OF THE INVENTION

In a process for the separation of wax from petroleum oils by the steps which include chilling the oil to form solid wax crystals and removing said wax crystals; the improvement of incorporating into said oil prior to formation of said wax crystals from about 0.001 to about 5.0 wt. % based on oil to be dewaxed, preferably 0.005 to 2.00 wt. %, of an oil-soluble polymer comprising at least 30 wt. % of a $C_{14}$–$C_{24}$ alpha-monoolefin, said polymer having a number average molecular weight in the range of about 1,000 to 200,000. The polymer in admixture with a Friedel-Crafts condensation product of a halogenated paraffin and an aromatic hydrocarbon, e.g. naphthalene, synergistically improves the separation of wax from petroleum oils.

The preferred dewaxing aids of this invention include polymers comprised of at least two unlike alpha-monoolefins containing from about 14 to 24 carbon atoms, more preferably 14 to 20 carbon atoms, in the molecule or a mixture of at least 2 unlike homopolymers of a $C_{14}$–$C_{24}$ alpha-monoolefin, more preferably a $C_{14}$–$C_{20}$ alpha-monoolefin. A copolymer comprised of 15 to 35 wt. % n-hexadecene-1, 15 to 30 wt. % n-octadecene-1, 10 to 20 wt. % n-eicosene-1 and 25 to 45 wt. % of a $C_4$–$C_8$, e.g. n-hexene-1, is especially preferred.

The $C_{14}$–$C_{24}$ alpha-monoolefin monomer which is used to prepare the dewaxing aid of the invention may be represented by the following general formula: $H_2C=CHR$, wherein R is a substantially linear aliphatic hydrocarbon radical containing from 12 to 22 carbon atoms. It is preferred, however, that R have the formula: $CH_3 — (CH_2)_n — CH_2—$, wherein $n$ is a whole number ranging from about 10 to about 20, more preferably, from about 12 to 16. The term "substantially linear" is used herein to denote those aliphatic side chains, i.e., R, which contain no more than one lower alkyl side chain such as methyl, ethyl, etc., in the radical and wherein said lower alkyl side chain, when present in the radical, is located at a position such that R has a linear portion containing at least 12 carbon atoms. Examples of suitable monomers include, among others, n-tetradecene-1, n-hexadecene-1, 3-methylhexadecene-1, n-octadecene-1, n-eicosene-1, 4-methyl eicosene-1, n-docosene-1 and the like.

In general, the dewaxing aid polymer of the invention will contain at least 30 wt. % of the aforedescribed $C_{14}$–$C_{24}$ alpha-monoolefin, preferably 60 to 100 wt. % of the $C_{14}$–$C_{24}$ alpha-monoolefin. Accordingly, the copolymers may contain 0 to 70 wt. % of another polymerizable monomer such as a $C_3$–$C_{12}$ alpha-olefin comonomer. These lower comonomers when polymerized with the aforedescribed $C_{14}$–$C_{24}$ alpha-monoolefins produce a copolymer which is easier to prepare and which is more economically attractive.

The $C_3$–$C_1$ alpha-olefins which are polymerized with the aforedescribed $C_{14}$–$C_{24}$ alpha-monoolefins may be represented by the following general formula: $H_2C=CHR'$, wherein $R'$ is a hydrocarbon radical containing from one to 10 carbon atoms. There appears to be no criticality as to the configuration of $R'$. Accordingly, $R'$ maybe an alkyl, aralkyl, aryl, alkylaryl, or cycloaliphatic group. Examples of such monomers include propylene, butene-1, hexene-1, octene-1, decene-1, 3-methyldecene-1, styrene and styrene derivatives such as p-methyl styrene, p-isopropyl styrene, alpha-methyl styrene, etc. The aforedescribed $C_{14}$–$C_{24}$ alpha-monoolefins may be polymerized with various other monomers. For example, effective copolymers may comprise 30 – 100 wt. % of the $C_{14}$–$C_{24}$ alpha-olefin of the invention and 0 – 70 wt. % of a polymerizable $C_5$–$C_{12}$ diolefin. Similarly, the polymers of the invention may comprise 30 to 100 wt. % of the aforedescribed $C_{14}$–$C_{24}$ alpha-monoolefin, 0 to 70 wt.

% of the aforedescribed $C_3$–$C_{12}$ alpha-olefin and 0 to 70 wt. % of a polymerizable $C_5$–$C_{12}$ diolefin. These diolefins which are useful for polymerization with the aforedescribed alpha-olefins include the bicyclic, alicyclic or aliphatic diolefins containing from about five to about 12 carbon atoms, preferably from about six to 12 carbon atoms. Non-limiting examples of suitable monomers include 1,5-cyclooctadiene, methylene norbornene, dimethylene norbornene, 1,5-hexadiene, dicyclopentadiene, 5-vinyl-2-norbornene, 1,5-cyclodecadiene, 2,4-dimethyl-2,7-octadiene, 3(2-methyl-1-propenyl) cyclopentene, 1,5-octadecadiene, and the like.

The preferred copolymer of the invention is comprised of at least two unlike linear $C_{14}$–$C_{20}$ alpha-monoolefins wherein at least two of said alpha-monoolefins each comprises 10 to 90 wt. %, preferably 30 to 60 wt. % of the polymer. Of interest is a copolymer prepared from at least two unlike linear $C_{14}$–$C_{20}$ alpha-monoolefins and consisting essentially of 0 to 60 wt. % of a $C_4$–$C_8$ alpha-monoolefin (e.g., butene-1 or hexene-1), 0 to 70 wt. % tetradecene-1, 0 to 70 wt. % hexadecene-1, 0 to 70 wt. % octadecene-1 and 0 to 70 wt. % eicosene-1. Of particular interest is a copolymer comprised of 15 to 60, preferably 25 to 45, wt. % hexene-1; 10 to 50, preferably 15 – 35, wt. % n-hexadecene-1; 10 to 40, preferably 15 – 30, wt. % n-octadecene-1; and 5 to 30, preferably 10 – 20, wt. % n-eicosene-1.

In another preferred embodiment, the dewaxing aid of the present invention comprises a mixture of at least two unlike homopolymers prepared from the aforedescribed $C_{14}$–$C_{20}$ alpha-monoolefins wherein no one homopolymer accounts fon more than 80 wt. %, preferably no more than 60 wt. %, of the polymeric mixture. A particularly effective mixture comprises 0 to 70 wt. % (e.g., 40 wt. %) polyhexadecene, 0 to 70 wt. % (e.g., 30 wt. %) polyoctadecene and 0 to 70 wt. % (e.g., 30 wt. %) of polyeicosene.

The polymers of the invention will generally have a number average molecular weight within the range between about 1,000 and 200,000. It is preferred, however, that the number average molecular weight range from about 1,500 to about 100,000, more preferably 2,000 to 30,000. In this connection, the number average molecular weights of up to about 50,000 are measured by Vapor Phase Osmometry (for example, by using a Mechrolab Vapor Phase Osmometer Model 310A) whereas higher number average molecular weights are measured by Membrane Osmometry.

The polymers of this invention may be conventionally prepared by polymerizing the monomers under relatively mild conditions of temperature and pressure in the presence of catalysts generally known as coordination catalysts. These catalysts are made of components of two types, namely, compounds of the heavy transition metals of Groups IV, V, and VI of the Periodic System beginning with titanium, vanadium, and chromium and organometallic compounds and hydrides of metals of Groups I, II, and III of the Periodic System wherein the amount of the compounds derived from a Group IV–VI metal may range from 0.01 to 2.0 moles per mole of the organometallic compound.

The compounds of the first type are preferably halides, oxyhalides and mixtures thereof, while titanium, and vanadium deserve preference as metals. The second component is preferably an organometallic compound of lithium, sodium, magnesium, or aluminum, in which the organic portions are preferably alkyl radicals. In these organometallic compounds, the valence of the metal can be partially saturated by halogens or alkoxyls, provided, naturally, that at least one bond binds the metal directly to a carbon atom. Mixtures of two or more compounds of the type described above can often be used to advantage.

Effective catalysts for polymerizing the monomers of the invention include the following combinations: aluminum triisobutyl and vanadium trichloride; aluminum triisobutyl, aluminum chloride, and vanadium trichloride; vanadium tetrachloride and aluminum trihexyl; vanadium trichloride and aluminum trihexyl; titanium tetrachloride and aluminum trihexyl, vanadium trichloride and aluminum trihexyl; titanium trichloride and aluminum trihexyl; titanium dichloride and aluminum trihexyl; etc.

The polymerization is usually carried out by mixing the catalyst components in an inert diluent such as a hydrocarbon solvent, e.g., hexane, benzene, toluene, xylene, heptane, etc., and then adding the monomers to the catalyst mixture at atmospheric or superatmospheric pressures and temperatures within the range of about 50° and 180°F. Usually atmospheric pressure is employed when polymerizing the monomers containing more than four carbon atoms in the molecule and elevated pressures are used for the more volatile $C_3$–$C_4$ alpha-olefins. The time of reaction will depend upon, and is interrelated to, the temperature of the reaction, the choice of catalyst, the pressure employed and the monomer conversion desired. In general, however, one half to 5 hours will complete the reaction.

Usually, based upon 100 parts by weight of polymer to be produced, about 120 to 100,000 parts by weight of solvent, and about 0.05 to 5 parts by weight of catalyst will be used in the polymerization.

The polymeric additive of this invention functions effectively as a dewaxing aid and filtration aid in those dewaxing processes involving chilling the oil to form solid wax crystals and subsequently removing the wax crystals. Particularly good results are secured in the conventional solvent dewaxing proccesses. It has been found that in these dewaxing operations, the removal of precipitated wax from a petroleum oil can be substantially improved by the incorporation of from about 0.001 to about 5 wt. %, e.g. 0.01 to 0.06 wt. % (based on weight of wax-containing oil) of the polymers or mixtures thereof of the invention.

While the polymeric additive of this invention may be used to separate wax from a number of petroleum stocks, such as residua, middle distillates and the like, it has special application to waxy distillate and residual lubricating oil fractions such as solvent neutrals and bright stocks. These fractions generally range in boiling points from about 400° to about 1,100°F. and contain from about 5 to about 30 wt. % wax.

Various methods may be used to effect the blending of the wax crystal modifier, the wax-containing oil, and the dewaxing solvent, where used. For example, the wax crystal modifier and the wax-containing petroleum oil may be combined prior to the addition of a dewaxing solvent or alternately, the dewaxing solvent can be admixed with the oil prior to the addition of the wax crystal modifier. Broadly, the admixing temperature should be above the cloud point of the wax-containing petroleum oil. For example, admixing temperatures of about 120°F. to about 250°F. may be used. It is preferred, however, that the temperature be from about 160° to 200°F.

Particularly desirable results are obtained when the polymeric additive of the invention is utilized in a conventional dewaxing process. For example, admixtures of the aforedescribed polymer, dewaxing solvent and wax-containing oil may be processed by chilling said admixture in any suitable manner to a wax precipitation temperature. The precipitated wax may then be removed by centrifugation or filtration, preferably the latter. Dewaxing operations are preferably conducted at a temperature within the range of about −40° to about +20°F., and, more preferably, at a temperature within the range of about −30° to about 15°F. Among the dewaxing solvents which may be advantageously employed, a large number are well known in the art and include benzene, toluene, acetone, methylethyl ketone, methylisobutyl ketone, propane, hexane, ethylene dichloride, aliphatic alcohols, naphtha, and mixtures thereof such as a 45/55 blend of methylethyl ketone and toluene, a 30/70 blend of methylethyl ketone and benzene, etc. The amount of solvent used will usually range from 0.5 to 3.5 volumes of solvent per volume of oil to be dewaxed.

As indicated hereinbefore, mixtures of the aforedescribed polyolefins and the well-known class of wax crystal modifiers made by the Friedel-Crafts condensation of a halogenated paraffin with an aromatic hydrocarbon synergistically improve the separation of wax from petroleum oils. The halogenated paraffin may, for example, contain from about eight to about 60 carbon atoms, preferably from about 16 to about 44, and from about 5 to about 25 wt. % chlorine, preferably from about 10 to about 18 wt. %. Typically, the halogenated paraffins used to prepare this well-known class of wax modifiers are themselves prepared by chlorinating to the above recited chlorine content a paraffin wax having a melting point within the range between about 105° and 190°F. The aromatic hydrocarbon used herein contains a maximum of three substituent groups and/or condensed rings and may be a hydroxy compound such as phenol, cresol, xylenol, or an amine such as aniline, but is preferably naphthalene, phenanthrene or anthracene. The Friedel-Crafts condensation products of the instant invention are prepared in accordance with well-known techniques, e.g. British Pats. Nos. 511,207 and 562,714.

The synergistic wax crystal modifier composition may comprise various amOunts of the aforedescribed polyolefin and Friedel-Crafts condensation product. Typically, the amounts employed will produce a mixture containing 25 to 75 wt. % (e.g. 50 wt. %) of the condensation product and 25 to 75 wt. % (e.g. 50 wt. %) of the polyolefin.

For ease in handling, the polymeric additive of the invention may be used in a concentrate form. For example, to facilitate storage and transportation, the polymer can be blended with a hydrocarbon solvent such as mineral oil, heptane, toluene, etc. to form a concentrate comprising from about 20 to about 80 wt. % hydrocarbon solvent and from about 20 to 80 wt. % of the polymeric additive of the invention.

The polymeric additive of the invention is found to be compatible with other additive materials and may be blended successfully with petroleum oils containing minor amounts of viscosity index improvers, rust inhibitors, lubricity agents, oxidation inhibitors and the like. The invention can be more fully understood by reference to the following examples.

DESCRIPTION OF THE PREFERRED EMBODIMENTS

Example 1

A homopolymer of n-tetradecene-1 was prepared as follows

Into a 500 milliliter 4-neck flask fitted with a mechanical stirrer, heating mantle, thermometer, condenser and gas inlet were charged under anhydrous conditions, 0.11 gram of a cocrystallized titanium trichloride-aluminum trichloride catalyst ($TiCl_3 \cdot 1/3 AlCl_3$), 75 milliliters of xylene as solvent and 0.41 gram of triethylaluminum. After stirring the catalyst-solvent mixture at room temperature for about 30 minutes, the mixture was heated to about 75°C. under a nitrogen blanket and 19 grams of n-tetradecene-1 was added thereto. After addition of the alpha-olefin was completed, the reaction mixture was heated to 70° − 80°C. for about 2 hours, whereupon 1 ml. of isopropyl alcohol was added to stop the reaction. The product mixture was then cooled to room temperature and thereafter mixed with about 10 volumes of methanol to precipitate the solid tetradecene homopolymer which was then filtered off and dried for about 12 hours in an oven maintained at about 60°C. and 120 mm. pressure. The resulting polymer weighed 13 grams and had a number average molecular weight of about 5,000 as measured by Vapor Phase Osmometry (VPO).

Example 2

Following the general procedure of Example 1, various homopolymers and copolymers were prepared from normal $C_{14}$–$C_{20}$ alpha-monoolefins. The resulting homopolymers and copolymers were then tested as dewaxing aids in a distillate lube stock and a residual lube stock. The properties of these oils are shown in Table I and hereinafter referred to as Test Oil A and Test Oil B.

TABLE I

Properties of Test Oils

| Inspection | Test Oil A[1] | Test Oil B[2] |
|---|---|---|
| ASTM Viscosity at 210°F., SUS | 27.9 | 160 |
| Gravity, API | 31.76 | 26.7 |
| ASTM Pour Point, °F. | 120 | 125 |
| Wax Content, Wt. % | 23.9 | 15 |

[1] A distilled lube stock from Texas Panhandle crude
[2] A residual lube stock from Louisiana crude Test Oil A was dewaxed by diluting with a solvent consisting of 55 volume % methylethyl ketone and 45 volume % toluene at a solvent/oil ratio of 3.1/1 and then chilling at the rate of 3°–6°F. per minute from a feed temperature of 140°F. to a filter temperature of 0°F. The chilled mixture was then continuously filtered through a refrigerated circular leaf filter at a pressure differential of 22 inches of mercury. The filtration cycle consisted of a filtration time of 28 seconds, a drying time of 5 seconds, a wash time of 22 seconds and a second drying time of 8 seconds.

In a similar manner, Test Oil B was dewaxed by diluting with hexane at a solvent/oil ratio of 3/1 and then chilling at the rate of 3°–6°F. per minute from a feed temperature of 140°F. to a filter temperature of −30°F. The chilled mixture was then continuously filtered through a refrigerated circular leaf filter at a pressure differential of 20 inches of mercury. The filtration cycle consisted of a filtration time of 36 seconds, a drying time of 9 seconds, a wash time of 27 seconds and a second drying time of 8 seconds.

The test oils were also dewaxed in the same manner as above except that 0.02–0.12 wt. % (based on weight of wax-containing oil) of a homopolymer, copolymer or mixture of homopolymers set forth below were each added to a separate oil sample prior to chilling. The feed mixtures comprising the individual polymers or mixtures thereof were then separately processed under the same dewaxing conditions as used in the above operation wherein no wax crystal modifier was employed.

The data obtained from the dewaxing of Text Oil A are shown below in Table II.

TABLE II

DEWAXING OF TEST OIL A

| Dewaxing Aid Used | Relative Filtration Rate[1] |
|---|---|
| None | 1.00 |
| 0.06 wt. % of n-tetradecene-1 homopolymer[2] | 1.91 |
| 0.06 wt. % of n-hexadecene-1 homopolymer[3] | 3.56 |
| 0.06 wt. % of n-octadecene-1 homopolymer[4] | 2.09 |
| 0.03 wt. % of n-tetradecene-1 homopolymer[2] + 0.03 wt. % of n-octadecene-1 homopolymer[4] | 4.23 |
| 0.03 wt. % of n-hexadecene-1 homopolymer[3] + 0.03 wt. % of n-octadecene-1 homopolymer[4] | 4.46 |

[1]Ratio of filtration rate for oil containing additive to filtration rate for oil with no additive
[2]Homopolymer of Example 1
[3]Number average molecular weight of about 6,800 (VPO)
[4]Number average molecular weight of about 7,300 (VPO)

The data obtained from the dewaxing of Text Oil B are shown below in Table III.

TABLE III

DEWAXING OF TEST OIL B

| Dewaxing Aid Used | Relative Filtration Rate |
|---|---|
| None | 1.0 |
| 0.05 wt. % of an-tetradecene-1 homopolymer[1] | 1.91 |
| 0.05 wt. % of n-hexadecene-1 homopolymer[2] | 1.98 |
| 0.05 wt. % of n-octadecene-1 homopolymer[3] | 1.81 |
| 0.05 wt. % of n-tetradecene-1/ n-octadecene-1 copolymer[4] | 2.67 |
| 0.05 wt. % of n-hexadecene-1/ n-octadecene-1 copolymer[5] | 2.86 |
| 0.05 wt. % of n-butene-1/ n-hexadecene-1 copolymer[6] | 2.53 |
| 0.05 wt. % of n-hexene-1/ $C_{16}$-$C_{20}$ copolymer[7] | 2.92 |

[1]Homopolymer of Example 1
[2]Number average molecular weight of about 6,600 (VPO)
[3]Number average molecular weight of about 4,900 (VPO)
[4]Copolymer comprising 38 wt. % tetradecene and 62 wt. % octadecene and having a number average molecular weight of about 2,450 (VPO)
[5]Copolymer comprising 40 wt. % hexadecene and 60 wt. % octadecene and having a number average molecular weight of about 2,350 (VPO)
[6]Copolymer comprising 40 wt. % butene and 60 wt. % hexadecene and having a number average molecular weight of about 9,200 (VPO)
[7]Interpolymer comprising 38 wt. % hexene, 26 wt. % n-hexadecene-1, 21 wt. % of n-octadecene-1, 15 wt. % n-eicosene-1 and having a number average molecular weight of about 28,000 (VPO)

It can be seen from the data in the above tables that polymers prepared from the alpha-olefins of the invention are very effective for improving the oil filtration rate in a conventional solvent dewaxing operation. Further, the above data demonstrate that copolymers of $C_{14}$–$C_{20}$ alpha-monoolefins and mixtures of unlike homopolymers of said monoolefins are more effective than an equivalent weight amount of a homopolymer or copolymer comprised of only one of said monoolefins.

Example 3

This example serves to illustrate the effect which the molecular weight of the polymeric dewaxing aid has on its ability to improve the oil filtration rate obtained in a dewaxing operation.

A copolymer prepared in the manner of Example 1 by polymerizing a monomer mixture consisting of 38 wt. % hexene-1, 26 wt. % hexadecene-1, 21 wt. % octadecene-1 and 15 wt. % eicosene-1 was fractionated into several fractions of various molecular weights by fractional precipitation using methanol addition to a polymer-benzene solution. Each of the polymer fractions was blended at 0.06 wt. % concentration (based on oil) with separate samples of Test Oil A and evaluated for dewaxing effectiveness in accordance with the test procedure of Example 2. The results given in Table IV show that more effective polymers have relatively low molecular weights.

TABLE IV

DEWAXING OF TEST OIL B

| Number Average Molecular (VPO) of Polymer Fraction | Relative Filtration Rate[1] |
|---|---|
| 13,000 | 2.13 |
| 28,000 | 2.28 |
| 37,600 | 1.35 |

[1]Ratio of filtration rate for oil containing additive to filtration rate for oil with no additive Example 4

The following example illustrates the synergistic effect between (a) a commercial Friedel-Crafts condensate wax crystal modifier (i.e. a condensation product of 4 moles of chlorinated 123°F. melting point paraffin wax containing 12 wt. % chlorine with 1 mole of naphthalene) and (b) a homopolymer of n-octadecene-1 prepared in the manner of Example 1 and having a number average molecular weight of about 8,600 (VPO).

Using the test procedure of Example 2, the wax-naphthalene condensation product, the polyoctadecene and mixture thereof were blended with separate samples of Test Oil A prior to dewaxing. The results given below in Table V show that the combination of the additives imparts an improvement which is significantly greater than that which could be obtained by the use of an equivalent weight amount of either material alone.

TABLE V

DEWAXING OF TEST OIL A

| Dewaxing Aid Used | Relative Filtration Rate[1] |
|---|---|
| None | 1.00 |
| 0.06 wt. % of wax-naphthalene condensate | 1.71 |
| 0.06 wt. % of polyoctadecene | 2.52 |
| 0.03 wt. % of wax-naphthalene condensate + 0.03 wt. % of polyoctadecene | 3.16 |

[1]Ratio of filtration rate for oil containing additive to filtration rate for oil with no additive It is not intended that this invention be limited to the specific examples presented by way of illustration. The scope of the invention is limited only by the appended claims.

What is claimed is:

1. In a process for the separation of wax from petroleum oils by the steps which include chilling the oil to form solid wax crystals and removing said crystals, the improvement comprising incorporating into said oil prior to formation of wax crystals from about 0.001 to about 5.0 wt. %, based on the weight of the oil, as a dewaxing aid to modify the wax crystals and permit easier filtration of said wax crystals from said oil, a Ziegler type oil-soluble polymer having a molecular weight in the range of about 1,000 to 200,000, selected from the group consisting of (A) copolymers consisting of $C_3$ to $C_{12}$ alpha-monoolefin in an amount of about 15 wt. % up to about 70 wt. % of said copolymer and $C_{14}$ to $C_{20}$ alpha-monoolefin in an amount of at least 30 wt. %, (B) copolymers consisting essentially of at least two different alpha-monoolefins each in the range of $C_{14}$ to $C_{24}$, and (C) a mixture of at least two different homopolymers of $C_{14}$ to $C_{24}$ alpha-monoolefins.

2. In a process as defined by claim 1, said oil-soluble polymer being said copolymer of $C_3$–$C_{12}$ alpha-monoolefin and said $C_{14}$–$C_{20}$ alpha-monoolefin, and wherein said polymer is the sole dewaxing aid present.

3. In a process as defined by claim 2, said copolymer consisting of 15 to 60 wt. % hexene-1, 10 to 50 wt. % n-hexadecene-1, 10 to 40 wt. % n-octadecene-1 and 5 to 30 wt. % n-eicosene-1.

4. In a process as defined by claim 1, said oil-soluble polymer being a copolymer of at least two different $C_{14}$–$C_{20}$ alpha-olefins, and wherein at least two of said alpha-monoolefins each comprises 10 to 90 wt. % of the polymer.

5. In a process as defined by claim 4, the improvement wherein the number average molecular weight of said copolymer is in the range of 2,000 to 30,000.

6. In a process as defined by claim 1, said oil-soluble polymer is said mixture of at least two different homopolymers of a $C_{14}$–$C_{24}$ alpha-monoolefin, and wherein no one homopolymer accounts for more than 70 wt. % of the polymeric mixture.

7. In a process according to claim 1, a second dewaxing aid which is the Friedel-Crafts condensation product of a halogenated paraffin with an aromatic hydrocarbon is also incorporated into the oil with said Ziegler type oil-soluble polymer.

8. In a process as defined by claim 7, said Friedel-Crafts condensation product being a condensation product of naphthalene and paraffin wax having a melting point of 120° to 190°F. and chlorinated to contain 5 to 25 wt. % chlorine.

* * * * *